United States Patent [19]

Deutsch et al.

[11] 4,129,486

[45] Dec. 12, 1978

[54] ULTRAVIOLET CURING PRINTING INKS HAVING IMPROVED SHELF LIFE

[75] Inventors: Albert A. Deutsch, Scarsdale, N.Y.; Richard Dennis, E. Rutherford, N.J.; Robert Gumbinner, Tarrytown, N.Y.

[73] Assignee: Polychrome Corporation, Yonkers, N.Y.

[21] Appl. No.: 904,143

[22] Filed: May 9, 1978

[51] Int. Cl.² .................. C08G 18/00; C08G 63/00
[52] U.S. Cl. ........................ 204/159.19; 96/115 P; 204/159.15; 204/159.16; 204/159.18; 204/159.23; 260/836; 260/837 R; 260/859 R
[58] Field of Search .................. 204/159.15, 159.16, 204/159.19, 159.23, 159.18; 96/115 P

[56] References Cited

U.S. PATENT DOCUMENTS

| | | | |
|---|---|---|---|
| 3,479,185 | 11/1969 | Chambers | 96/84 |
| 3,549,367 | 12/1970 | Chang et al. | 96/35.1 |
| 4,056,453 | 11/1977 | Borzynski et al. | 204/159.23 |

*Primary Examiner*—Richard B. Turer

[57] ABSTRACT

This invention provides for improved printing inks which cure upon exposure to ultraviolet radiation and furthermore demonstrate greatly extended shelf lives and stability as compared to prior art inks. The photosensitive component of the ink comprises a mixture of Michler's ketone and an o-halogen substituted hexa-aryl biimidizolyl compound.

7 Claims, No Drawings

ULTRAVIOLET CURING PRINTING INKS HAVING IMPROVED SHELF LIFE

BACKGROUND OF THE INVENTION

The prior art describes a wide variety of ultraviolet curable inks. For the most part, commercially acceptable UV curable inks employ a benzophenone photoinitiator. The main problem with the inks of the prior art is their relatively short shelf life - normally in the range of from 3 to 6 months, after which they were rendered useless, normally due to gelling.

It has been found that by employing a very specific combination of photoinitiators in conjunction with certain acrylated epoxy or urethane type oligomers that a commercially acceptable UV curable ink may be produced which has a shelf life of up to one year without substantial loss in cure speed and without undergoing polymerization when stored in the dark at room temperature.

DESCRIPTION OF THE PRIOR ART

U.S. Pat. No. 3,479,185 claims a photoinitiating system of a 2,4,5-triphenylimidazolyl dimer consisting of two lophine radicals and an agent selected from the group consisting of a free radical producing hydrogen donor and an active methylene compound. Among the list of materials describing the above group, Michler's ketone is not included. In addition, no reference is made for use in inks to improve stability.

U.S. Pat. No. 3,549,367 describes a photoinitiating system of a 2,4,5-triphenylimidazolyl dimer consisting of two lophine radicals and a p-aminophenyl ketone. Although this composition is described as being colorable, the reference strictly comprehends a coating formulation for lithographic printing plates and not for UV curable inks.

U.S. Pat. No. 3,615,567 describes a light-hardenable element comprising a preformed, compatible, coherent, film-forming macromolecular organic polymer, a free radical-producing hydrogen donor agent, an imidazolyl dimer and, optionally, a macromolecular organic polymer protective layer; and in intimate association therewith, a halide selected from the group consisting of ammonium, barium, calcium, magnesium aluminum, mercuric, zinc, cobaltous, cuprous, and ferric chlorides; magnesium bromide and aluminim iodide. Again, only a printing plate is contemplated by this disclosure rather than an ink. Also, Michler's ketone is not employed. Also, in contradistinction, the present invention does not employ preformed polymers.

U.S. Pat. No. 4,056,453 describes a UV curable ink whose photoinitiator consists of a mixture of benzophenone and Michler's ketone, however no such photoinitiating system is herein claimed.

SUMMARY OF THE INVENTION

The instant invention provides an ultraviolet curable ink composition having significantly enhanced long term dark storage stability which comprises:
  I. An ethylenically unsaturated oligomer comprising an epoxy or urethane type material having terminal acrylic, methacrylic or allylic groups, a molecular weight of from about 200 to 1300, one carbon-carbon double bond linkage per 50–400 molecular weight units, and a preponderance of which material has a functionality greater than 1;
  II. A photoinitiator system consisting of the mixture of Michler's ketone and an o-chloro-hexa-aryl biimidzolyl composition; and
  III. A colorant conventionally employed in forming printing inks.

It is therefore an object of the present invention to provide an ultraviolet curable printing ink which is capable of maintaining its useful characteristics without dark polymerization for up to twelve months.

It is a further object of the present invention to provide an ultraviolet curable printing ink which does not sacrifice commercially required light sensitivity while increasing its shelf life.

These and other objects of the instant invention will be in part described and in part apparent upon consideration of the detailed description of the preferred embodiment.

DETAILED DESCRIPTION OF THE PREFERRED EMBODIMENT

As hereinbefore mentioned, the instant invention provides a storage stable, ultraviolet curable printing ink which comprises:
  I. An ethylenically unsaturated oligomer comprising an epoxy or urethane type material having terminal acrylic, methacrylic or allylic groups, a molecular weight of from about 200 to 1300, one carbon-carbon double bond linkage per 50–400 molecular weight units, and a preponderance of which material has a functionality greater than 1;
  II. A photoinitiator system consisting of the mixture of Michler's ketone and an o-chloro-hexa-aryl biimidizolyl composition; and
  III. A colorant conventionally employed in forming printing inks.

Colorants useful in the practice of the instant invention include dyes and pigments enumerated in the Color Index which do not substantially interfere with the capability of the photoinitiated curing of the unsaturated compound upon exposure to ultraviolet radiation. Specific examples include Furnace Black, Pthalo Blue, Rhodamine Red, Reflex Blue, Lithol Rubine Red, Benzidine Yellow, Pthalo Green, Regal 400R Black and Victoria Blue Toner.

Such colorants may be present in the product of this invention in amounts of up to 50% by weight. A preferred proportion is from 5% to 30% and a most preferred range is from 10% to 20%.

The photoinitiator system of the instant invention comprises a mixture of Michler's ketone (4,4 dimethylaminobenzophenone) and a hexa-arylbiimidizolyl compound (H.A.B.I.) as follows,

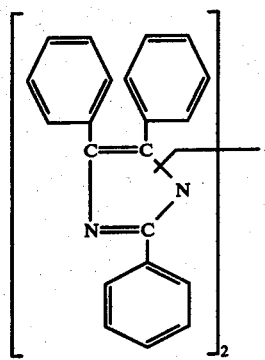

preferably where the phenyl groups are substituted with chlorine in the ortho position. Such compounds are more completely disclosed in U.S. Pat. Nos. 3,479,185 and 3,549,367 which are specifically incorporated herein by reference.

The operable amount of H.A.B.I. in the product of this invention ranges from 0.1% to 25.0%, preferably from 3.5 to 7.5% and most preferably from 5.0 to 7.5%.

The operable amount of Michler's Ketone in the product of this invention ranges from 0.1% to 25.0%, preferably 2.0 to 6.0% and most preferably from 3.0 to 6.0%.

The balance of the ink formulation of the present invention comprises an ethylenically unsaturated oligomer comprising an epoxy or urethane type material having terminal acrylic, methacrylic or allylic groups, a molecular weight of from about 200 to 1300, one carbon-carbon double bond linkage per 50-400 molecular weight units, and a preponderance of which material has a functionality greater than 1. Typically these oligomers comprise from about 50 to 99% of the ink formulation and preferably from 60-72%.

Preferred oligomers comprise the reaction products of a diglycidyl ether with acrylic or methacrylic acid. Other preferred oligomers comprise the reaction product of an organic diisocyanate with hydroxyethyl acrylate, hydroxyethyl methacrylate or allyl alcohol.

Oligomers having molecular weights above 1300 or which have a double bond density of above one linkage per 50-400 units of molecular weight are inherently more stable than those within these ranges and therefore do not require use of the instant photoinitiator system to increase their stable lifetimes. However, their rate of curing so as to convert their liquid nature to a tack free coating is too slow for commercial use as an ultraviolet curing printing ink. The oligomers described herein possess the requisite cure speeds for use as a UV ink, however, this very property increases the instability, i.e., dark reaction propensity, of the material. In other words, normally as the cure speed of the material increases, its instability increases.

It has been unexpectedly found that the photoinitiator system comprising the mixture of Michler's Ketone and a o-chloro hexa-arylbiimidizolyl compound unexpectedly prolongs the shelf life and reduces the dark reaction instability of certain fast curing oligomers useful for UV curing inks.

Ultraviolet curable printing inks are normally applied to a printed surface at a coating thickness of from about 2 to 3 microns. Curing is effected by exposure of the printed ink to an ultraviolet light source. Typically this is done by employing a 200w/in lamp at a 3 inch distance. Using such an exposure apparatus, curing should be achieved at a rate of 275 to 625 feet per minute and preferably in excess of 450 feet per minute.

As hereinbefore mentioned, the problem with UV curing printing inks is that curing speed and shelf life are inversely proportional. The faster the curing speed, the shorter the shelf life. The prior art establishes a commercially determined balance of these factors.

It is the point of novelty of the instant invention that the balancing point of these parameters has been raised. That is, for a given curing speed, the shelf life of the ink is longer.

The following ink formulations were constructed as non-limiting examples to demonstrate this phenomenon. Stability is measured as the elapsed time until gelling of the material in a dark enclosure under both a room temperature of 77° F. and an accelerated shelf life test at 140° F.

TABLE I

| Formulations In Parts By Weight | A Control | B | C | D | E | F |
|---|---|---|---|---|---|---|
| DV-545* | 66.0 | 66.0 | 66.0 | 66.0 | 66.0 | 66.0 |
| Benzophenone | 5.0 | — | — | — | — | — |
| Michlers Ketone | 1.0 | 4.0 | 6.0 | 3.0 | 3.0 | 4.0 |
| O—Cl HABI | — | 5.0 | 7.5 | 3.75 | 5.0 | 3.75 |
| Wax S-379 | 2.0 | 2.0 | 2.0 | 2.0 | 2.0 | 2.0 |
| Regal 400 R | 14.5 | 14.5 | 14.5 | 14.5 | 14.5 | 14.5 |
| Lithol Rubine | 1.4 | 1.4 | 1.4 | 1.4 | 1.4 | 1.4 |
| Phthalo Blue | 0.6 | 0.6 | 0.6 | 0.6 | 0.6 | 0.6 |
| Triethanol amine | 0.5 | — | — | — | — | — |
| Trimethylolpropane triacrylate | 9.4 | 9.4 | 9.4 | 9.4 | 9.4 | 9.4 |
| Stability at 140° F accelerated life test | gels after 5–6 Days | no gelling after 5 wks | no gelling after 5 wks | no gelling after 5 wks | no gelling after 5 wks | no gelling after 5 wks |
| Stability at 77° F | 3.5 mos | 12+ mos | 12+ mos | 12+ mos | 12+ mos | 12+ mos |
| Cure speed for a 2-3 micron coating using 1 200 w/in lamp at 3 in. | 450–475 ft/min. | 450 ft/min. | 450–475 ft/min | 275 ft/min | 400 ft/min | 325 ft/min |

*acrylated urethane oligomer available from Polychrome Corp., Yonkers, New York.

TABLE II

| Formulations In Parts By Weight | A Control | B | C | DS |
|---|---|---|---|---|
| DV-580* | 71 | 71 | 71 | 71 |
| Benzophenone | 5 | — | — | — |
| Michlers Ketone | 1 | 4 | 4 | 2 |
| O—Cl HABI | — | 5 | 5 | 5 |
| Wax S-379 | 2 | 2 | 2 | 2 |
| Regal 400R | 14.5 | 14.5 | 14.5 | 14.5 |
| Lithol Rubine | 1.4 | 1.4 | 1.4 | 1.4 |
| Pthalo Blue | 0.6 | 0.6 | 0.6 | 0.6 |
| Triethanolamine | .5 | .5 | — | .5 |
| Trimethylolpropane triacrylate | 4.0 | 4.0 | 4.0 | 4.0 |
| Stability at 140° F accelerated life test | gels after 2¼ 3 days | gels after 6 wks | gels after 8 wks | gels after 6 wks |
| Stablity at 77° F room temperature | 3½–4 mos | 12+ mos | 12+ mos | 12+ mos |
| Cure Speed for 2 2-3 micron coating using 1 200 w/in lamp at 3 in. | 450–475 ft/min | 500 ft/min | 350 ft/min | 500 ft/min |

*acrylated epoxy oligomer availabe from Polychrome Corporation, Yonkers, New York

We claim:
1. An ink composition which is curable upon exposure to ultraviolet radiation which comprises:

I. An ethylenically unsaturated oligomer comprising an epoxy or urethane type material having terminal acrylic, methacrylic or allylic groups, a molecular weight of from about 200 to 1300, one carbon-carbon double bond linkage per 50-400 molecular weight units, and a preponderance of which material has a functionality greater than 1; and II. A photoinitiator system comprising Michler's Ketone and a o-halogen hexa-aryl biimidizolyl compound; and III. A colorant conventionally employed in forming printing inks.

2. The ink composition of claim 1 wherein said oligomer comprises the reaction product of a glycidyl ether with acrylic or methacrylic acid.

3. The ink composition of claim 1 wherein said oligomer comprises the reaction product of an organic diisocyanate with hydroxyethyl acrylate, hydroxyethyl methacrylate or allyl alcohol.

4. The ink composition of claim 1 wherein the oligomer is present in an amount of from about 50% to 99% by weight.

5. The ink composition of claim 1 wherein the colorant is present in an amount of up to 50% by weight.

6. The ink composition of claim 1 wherein the Michler's Ketone is present in an amount of from about 0.1% to 25.0% by weight and the o-halogen hexa-aryl biimidizolyl compound is present in an amount of from about 0.1% to 25.0% by weight.

7. The ink composition of claim 1 wherein one or more of the phenyl groups of the o-halogen hexa-aryl-biimidizolyl compound are substituted with chlorine at the ortho position.

* * * * *

UNITED STATES PATENT AND TRADEMARK OFFICE
CERTIFICATE OF CORRECTION

PATENT NO. : 4,129,486

DATED : December 12, 1978

INVENTOR(S) : Albert Deutsch et al.

It is certified that error appears in the above-identified patent and that said Letters Patent are hereby corrected as shown below:

Item [75] "Albert A. Deutsch" should read --Albert Deutsch--.

Signed and Sealed this

Eleventh Day of March 1980

[SEAL]

Attest:

SIDNEY A. DIAMOND

Attesting Officer

Commissioner of Patents and Trademarks